United States Patent [19]

Verhelst et al.

[11] Patent Number: 5,068,809
[45] Date of Patent: Nov. 26, 1991

[54] FORMATTING SYSTEM

[75] Inventors: Paulus W. E. Verhelst, Venlo, Netherlands; Werner J. Winiger, Richterswil, Switzerland; René F. A. Collard, Gennep, Netherlands

[73] Assignee: Oce-Nederland B.V., Netherlands

[21] Appl. No.: 486,800

[22] Filed: Mar. 1, 1990

[30] Foreign Application Priority Data

Mar. 2, 1989 [NL] Netherlands ............... 8900519

[51] Int. Cl.$^5$ ............................................. G06F 3/14
[52] U.S. Cl. ..................................... 395/145; 395/144
[58] Field of Search ....................... 364/518, 521, 523

[56] References Cited

U.S. PATENT DOCUMENTS

| 4,608,664 | 8/1986 | Bartlett et al. | 364/523 |
| 4,723,209 | 2/1988 | Hernandez et al. | 364/518 X |
| 4,755,955 | 7/1988 | Kimura et al. | 364/518 |
| 4,891,770 | 1/1990 | Hollett | 364/518 X |
| 4,974,174 | 11/1990 | Kleinman | 364/518 X |

FOREIGN PATENT DOCUMENTS 0199908 12/1986 European Pat. Off. .

OTHER PUBLICATIONS

Gutnecht, J.; "Concepts of the Text Editor Lara", Communications of the ACM, Sep. 1985; vol. 28, No. 9, pp. 942–959.
Morris, R. A.; "Is What You See Enough to Get?", Proteat II, Boole Press Limited; 1985 pp. 56–81.

Primary Examiner—David L. Clark
Attorney, Agent, or Firm—Reed Smith Shaw & McClay

[57] ABSTRACT

Desktop publishing system for preparing and managing documents in accordance with a model defined by graphic properties by using input document information and commands. This model is specified by a number of differently oriented sets of grid lines equidistantly oriented per set, for the positioning of said document information. On the basis of the last grid line used as reference line for graphic elements, the format data of the graphic elements positioned as well as to be positioned, and a certain spacing a grid line to be defined as the next reference line for the graphic elements to be positioned is selected from the grid lines following the first mentioned reference line.

3 Claims, 14 Drawing Sheets

OPERATOR:

```
CALLS UP PROPERTIES
OF "MAIN HEADING" TYPE
          │
          ▼
CURSOR — "ITALICS"
          │
          ▼
PRESS/RELEASE MM
          │
          ▼
PRESS MM
          │
          ▼
CURSOR — "APPLY"
          │
          ▼
RELEASE MM
```

SYSTEM:

```
DISPLAYS PROPERTIES
WINDOW OF "MAIN HEADING"
          │
          ▼
MOVES FRAME TO "ITALICS"
          │
          ▼
DISPLAYS MENU (FIG. 8b)
          │
          ▼
SETS "STYLE" TO "ITALICS"
          │
          ▼
APPLIES CHANGE TO ALL
COMPONENTS OF
"MAIN HEADING" TYPE
```

```
┌────────┐
│ APPLY  │
├────────┤
│ RESET  │
└────────┘
```

FIG. 8b          FIG. 8a

PART 1

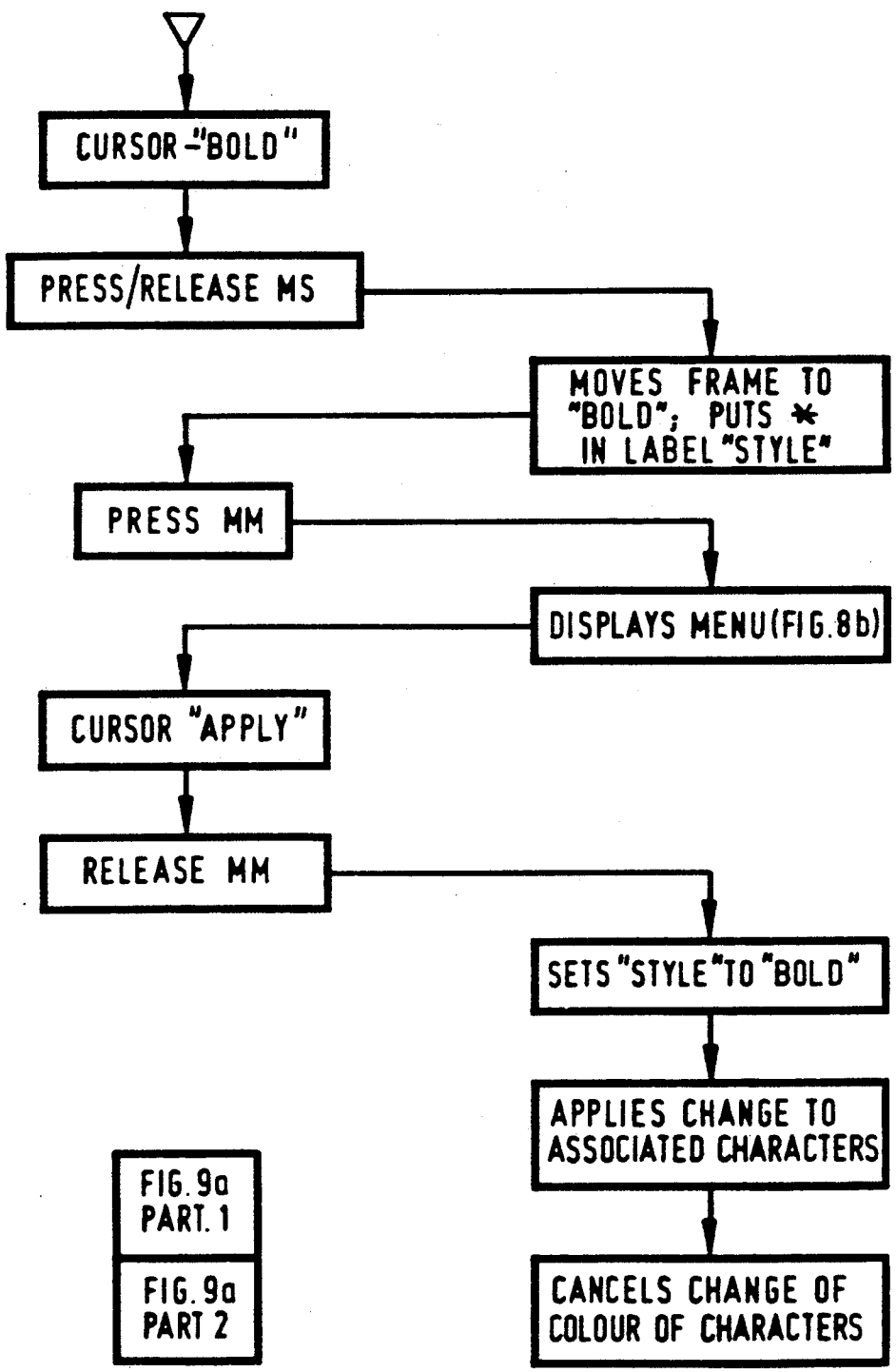

PART 1

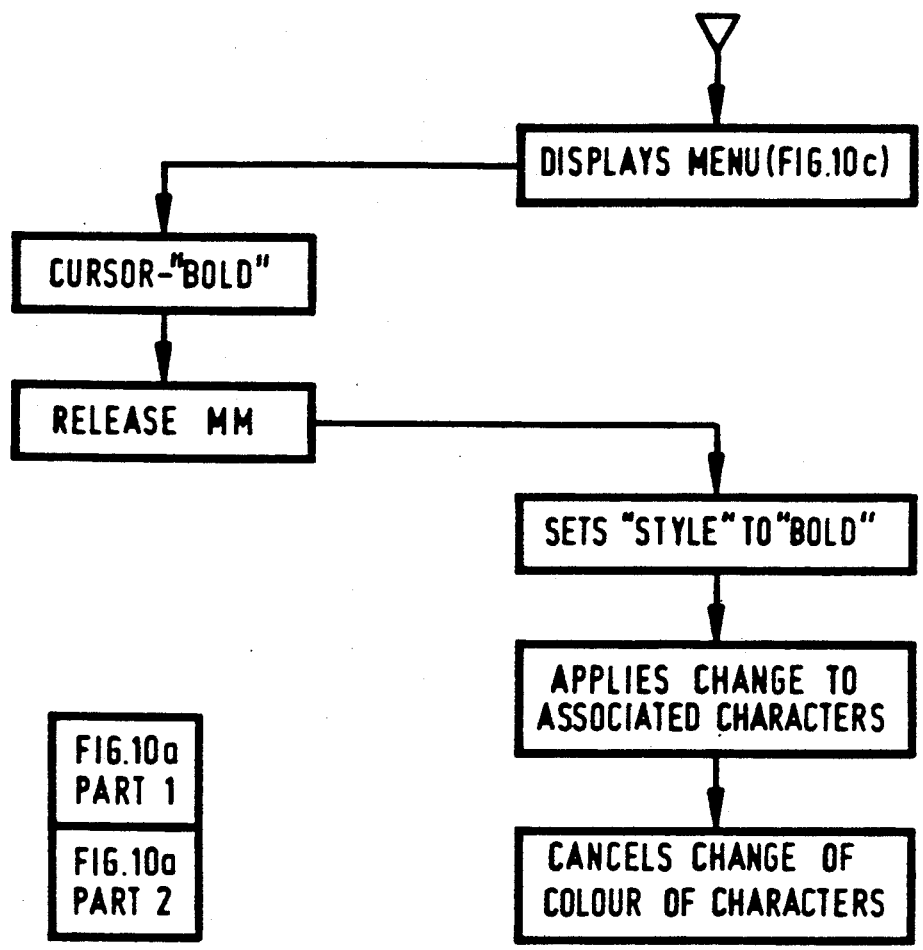
FIG. 10a
FIG. 10a PART 2
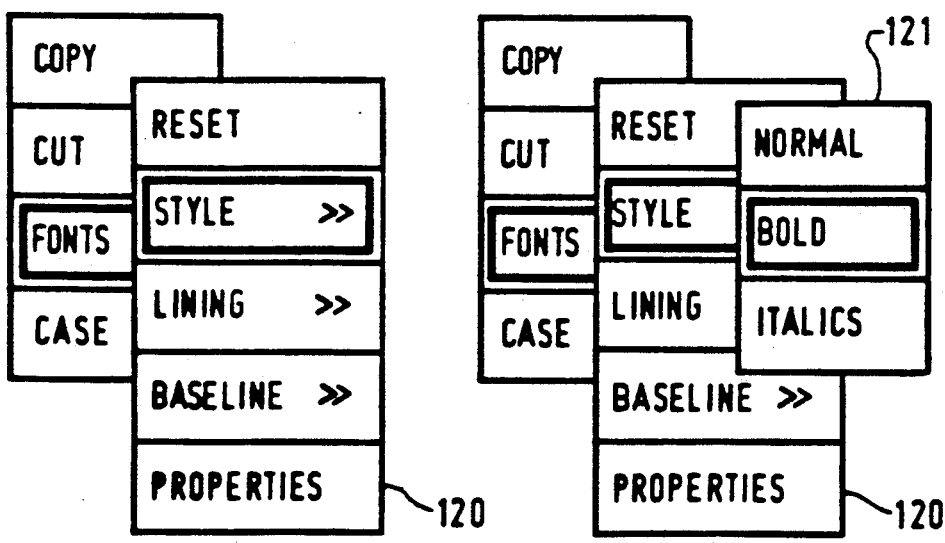
FIG. 10b
FIG. 10c

This is 18 point text on an 18 point page grid. This is 18 point text on an 18 point page grid.

This is 18 point text. This is 24 point text.

This is 18 point text.

This is 24 point text.

This is 24 point text.

This text has a different local grid of 24 point instead of 18 point. This text has a different local grid of 24 point instead of 18 point. This text has a different local grid of 24 point instead of 18 point.

FIG. 12

FORMATTING SYSTEM

FIELD OF THE INVENTION

The invention relates to a desktop publishing system having inputting means for inputting commands and document information relating to graphic elements, and a processing unit adapted, by reference to the said document information and commands, to prepare and manage documents to a model distinguished by graphic properties.

BACKGROUND OF THE INVENTION

Various text editing systems and image processing systems are known, for example, European Patent Application 0 188 072 A1 and Gutknecht, "Concepts of the Text Editor LARA," Vol. 28, No. 9, Communications of the Association of Computing Machinery (September 1985). A text editor having a technique for defining line unit spacing is described in European Patent Application 0 199 908 A2 wherein a pop-down menu shows a command bar and menu of selectable parameters defining margins and spacing.

A system to prepare and manage documents to a model is available commercially in the form of a computer and a software package known as the "Workstation Publishing System" by Interleaf, Inc., Cambridge, Mass., U.S.A., and described, for example in "Is What You See Enough To Get?" by R.A. Morris (in: PRO-TEXT II: Proceedings of the Second International Conference on Text Processing System, Dublin, 1985, ISBN 0 906738 50X). In this system, the inputting means comprise a keyboard and a mouse. The mouse can be used by the operator to select a position on the screen, whereupon he can input commands or text at that place on the screen by using the keyboard. This system also uses menus which appear on the screen locally after a button on the mouse has been pressed and which comprise a set of commands from which the operator, again using the mouse, can select and execute one.

The known system enables the operator to prepare a document consisting of different components, such as headings, text blocks, footnotes etc. This document is displayed on the screen in a text window provided with a margin. A label with the name of that component is provided in that margin at the start of each component.

The external characteristics of each component, such as type face and size, margin positions, typographical functions, and so on, are fixed in the properties which may have a different setting or value for each component. The set of properties of a component may be displayed on the screen in a separate window by bringing it up via a menu with the mouse at the label of that component. This window also displays the values of the properties. These can be changed by the operator. If he does not change them, then the values pre-programmed by the supplier (default values) apply.

To increase legibility, the operator will often wish to make the appearance of certain components different, e.g., by printing the heading in bold and centered on the line. He can achieve this by giving the properties of that component a corresponding value.

This system has one basic component from which the operator can form a number of different components by giving one or more of the properties a different value. In that way he can define a number of components tailored to different applications in the document by means of properties which have different values from one another. By giving these components different names (the name of a component is also a property), he can make them distinguishable. A component specialized in this way can then be used at different places in a document.

At the operator's choice a change of the value of properties of a component can be made to apply to all the components with the same name as the amended component.

Components are built up of sub-components, e.g., letters. A sub-component also has properties which describe its appearance. As a rule these will have values (sub-local values) identical to those of the corresponding properties of the component to which the sub-component belongs (the local values), but sometimes they will differ, for example if a single word in a paragraph is printed in bold face or in italics.

A desktop publishing system of the type described above has the disadvantage that positioning of the graphic elements in the document to be prepared does not depend on special properties of the input document information, such as the presence of text elements to be positioned as subscripts and/or superscripts, specific mathematical symbols, a plurality of formats associated with letter fonts, and various formats associated with elementary constituents for creating drawings. The occurrence of specific document information results in a less attractive lay-out of the document to be prepared. The object of the present invention is to provide a solution to this problem.

SUMMARY OF THE INVENTION

According to the invention, the model to be used in the said desktop publishing system is specified by a number of sets of parallel grid lines for positioning the input document information. At least some of the grid sets are allocated in different orientation directions. The processing unit of the present invention comprises means for registering input data in respect of the grid line spacing and orientation direction applicable per set. Means are included which operate on the basis of the last grid line used as reference line for positioning graphic elements and which take into account the format data of the graphic elements positioned with respect to the reference line to format data of the graphic elements yet to be positioned with respect to a following grid line as reference a line, and a certain spacing between the graphic elements, for the selection from the grid lines following the first mentioned reference line the next grid line which is to be considered as a reference line for the graphic elements still requiring to be positioned.

A very practical embodiment of a desktop publishing system according to the invention is obtained using two sets of parallel grid lines, the orientation directions being perpendicular to one another, thus giving a document model with a rectangular grid structure.

In preparing text documents data concerning the maximum value of the height (ascender) projecting above the reference line or base line for the characters occurring in that font and the maximum value of the height (descender) projecting beneath said base line are known for each letter font. If a plurality of letter fonts are used in the case of the last reference line or base line used, the maximum value ($d_{max}$) of the respective descender values is determined. This is also done ($a_{max}$) in respect of the associated ascender values of the letter fonts to be used for a following text line. The next grid line situated at the minimum at a distance equal to the sum of separate maximum values $a_m$ and $d_m$ of the last reference line or base line used plus the spacing, is utilized as the next reference line or base line in respect of the characters still to be positioned thereon.

Other features and advantages of the system according to the invention will become clear from the accompanying description and associated drawings, in which like references refer to like parts.

BRIEF DESCRIPTION OF THE DRAWINGS

FIG. 1b is a diagram showing the configuration of the system in FIG. 1a;

FIG. 8a is a diagram of a procedure for changing the value of properties;

FIG. 10a, Parts 1 and 2, is an alternative to the procedure in FIG. 9a;

FIG. 12 is a diagram of a page containing text on a grid; and

FIGS. 7b, 7c, 7d, 8b, 9b, 9c, 10b, 10c and 11b illustrate selection menus displayed on the screen in connection with one of the procedures.

PRESENTLY PREFERRED EMBODIMENTS

System Configuration

Figure 1A:
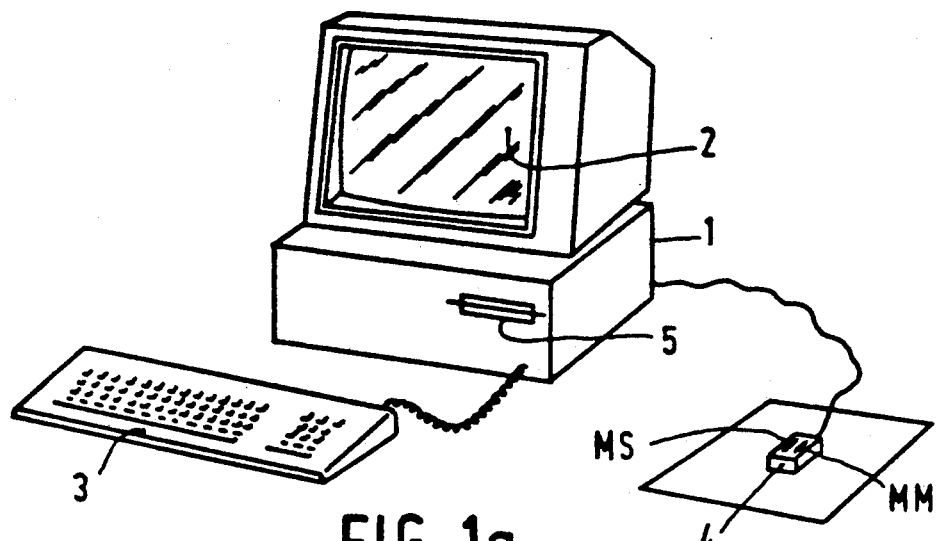
FIG. 1a illustrates a system according to the invention.
Figure 1B:
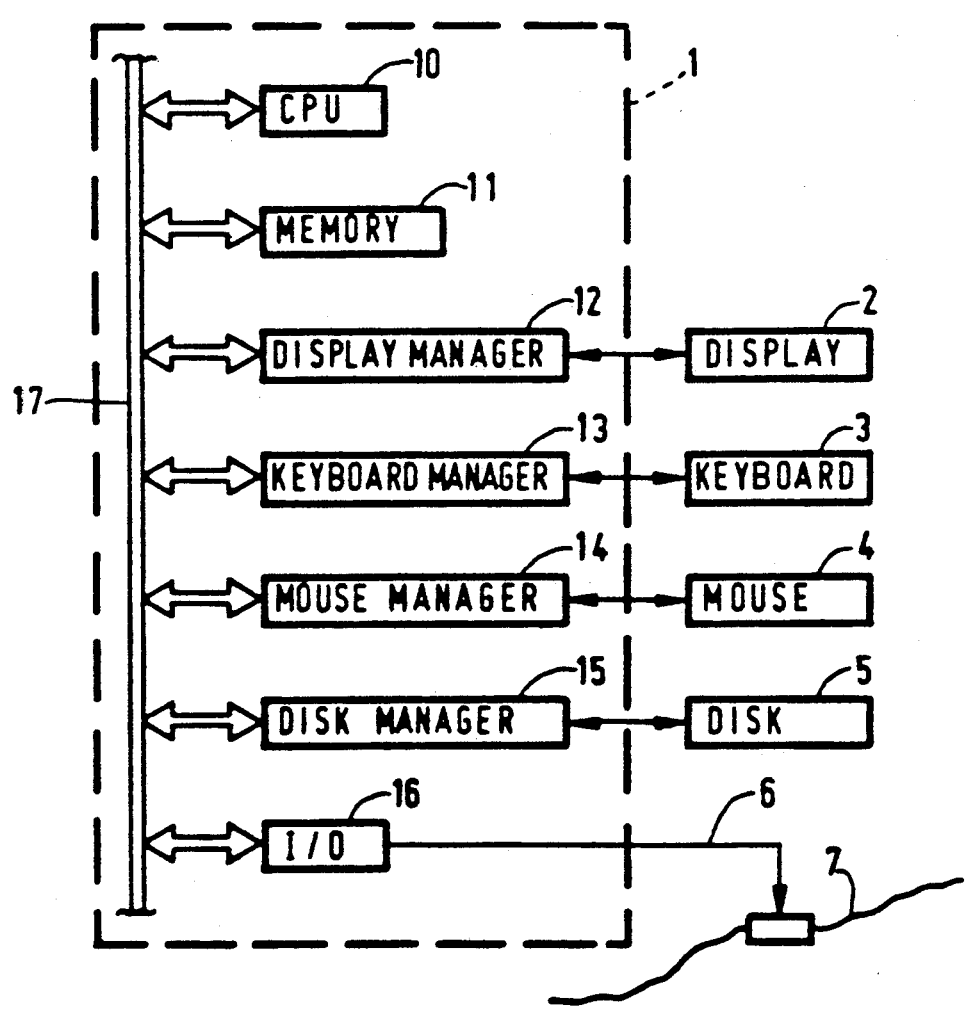

FIGS. 1a and 1b are diagrams showing a possible embodiment of a system configurations according to the invention. This system comprises a processing unit 1, a screen 2, a keyboard 3, a mouse 4, a memory disk 5 and a connection 6 to a network 7 for communication with a printer or with other external equipment. The processing unit 1 contains a central processor 10, a memory 11, control units 12, 13, 14 and 15 for, respectively, the screen 2, the keyboard 3, the mouse 4 and the memory disk 5, and also a communications unit 16 which provides communication via the network 7 to external equipment. The units 10 to 16 in the processing unit 1 are interconnected via a system bus 17.

A pointer element or cursor can be moved over the screen 2 by means of the mouse 4. The mouse 4 is provided with at least two press buttons MS and MM for giving commands to the system. By means of the first press button (MS) the operator can select an element indicated on the screen by the cursor, i.e., indicate that an action subsequently to be performed is to be carried out on the data represented by the indicated element on the screen. The system generally gives the operator a feedback by changing the color of the selected element on the screen.

The second press button (MM) is the menu button. When the operator presses this, the system shows on the screen at the cursor location a selection menu with system commands, one of which the operator can indicate by moving the mouse/cursor. The menu generally consists of a number of fields each of which contains a command. When the cursor reaches a field, it changes color to indicate that it is selected. When the button MM is released, the system executes the indicated command and removes the menu from the screen. If the operator moves the cursor completely outside the menu and then releases the button MM, the menu disappears from the screen and no action takes place.

A menu may have different levels, i.e., sub-menus can be called up from one or more menu fields, e.g., by moving the cursor outwards in said menu field in a direction indicated by a sign.

The use of a mouse and selection menus is known, for example, from U.S. Pat. No. 4,464,652, which describes a selection menu of the pull-down type in combination with a mouse, so that details of the technology required for this will not be discussed here.

The functions described here can of course be embodied by means other than a mouse, e.g., a joystick or function keys on the keyboard.

Document Model

Figure 2:
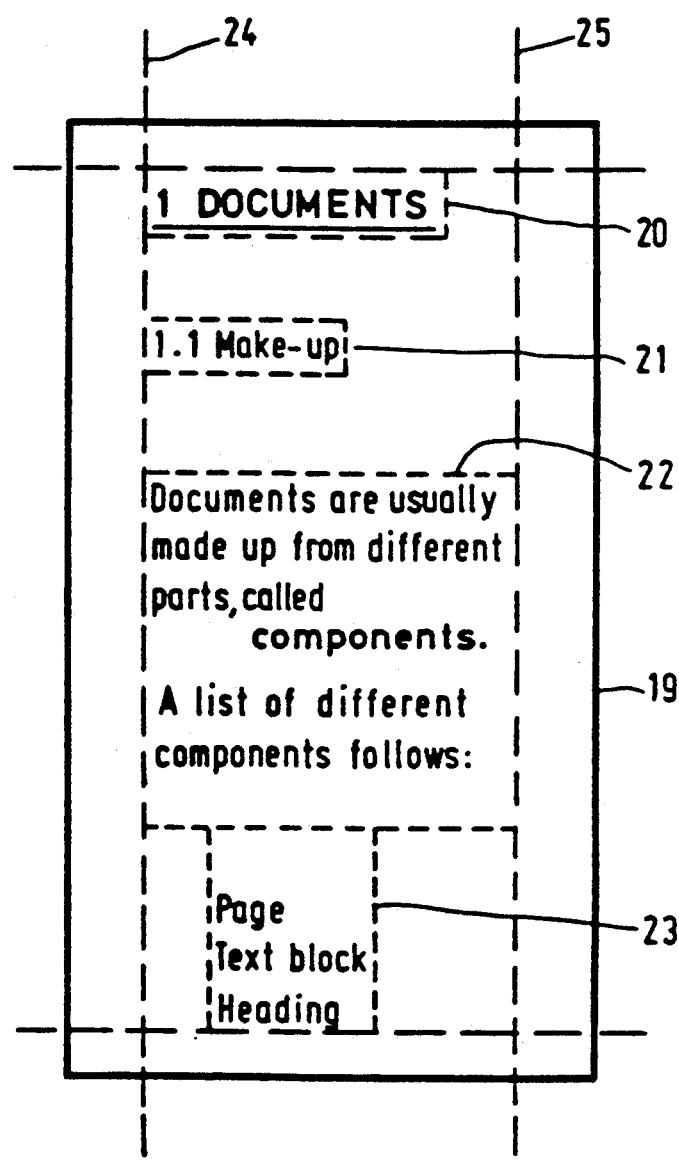
FIG. 2 is an example of a document.

FIG. 2 shows an example of a document with reference to which an explanation will be given of the model for documents used in the system according to the invention.

The document in FIG. 2 comprises five components, i.e., a page 19, a heading 20, a subheading 21, a text block 22 and a table 23.

Components have a name, a content and properties. The content is formed by text or a graphic display. The properties determine the appearance of the component. The name, the content and the value of the properties of a component can all be filled in and amended by the operator.

The document model of the system according to the invention has various component kinds which differ from one another in respect of their usability in a document, such as "page", "heading", "text block", and so on. The different component kinds have properties coordinated with their function, e.g.,:

For a "page": marginal lines, layout parameters for fixed additions ("headers", "footers"), printer instructions;

For a "heading": layout parameters, automatic numbering;

For a "text block":layout parameters, location with respect to page margin; and so on.

Different component kinds thus have different properties as a result of their different functions. Some of them are completely independent and others are defined just with respect to the properties of other component kinds, e.g., the location of a "text block" is defined with respect to the margins of the "page".

Component types arise from filling in values for the name and properties. For example, within the "page" component kind it is possible to form the types "front page", "text page" and "back page" by filling in the value of the properties in different ways. The name of a component type should distinguish the resulting component types from one another. In the example of FIG. 2 the components 20 and 21 both belong to the "heading" kind, but component 20 is of the "main heading" type and component 21 is of the "sub-heading" type. These types differ from one another as a result of the different value of the "style" property: bold or normal. Similarly, the components 22 and 23 both belong to the "text block" kind, but component 22 is of the "text" type and component 23 of the "table" type, these types differing from one another in respect of their location relative to the margins 24 and 25 (the location of which is fixed in the properties of the "page" 19).

Different component kinds and component types are pre-programmed as standard in the system according to the invention. These give sufficient facilities for normal text processing. The advantage of preprogramming the different components kinds and types is that in this way some uniformity can be obtained in the finished product ("house style").

Sub-components, e.g., individual alphanumerical characters within a component, in turn have properties. Their value is generally equal to that of the corresponding properties of the component in which they are situated, but they may differ therefrom.

Management System

The content and the properties of the page component and the other components are managed by a management program which runs in the central processor and the memory of the system. This management program manages the properties of the component types and of the sub-components separately. In the system described here management of the deviating properties of sub-components is carried out by reference to an amendment list which indicates what deviations there are with respect to the values of the properties of the component types.

By means of the management program the operator can make changes to the filled-in value of properties. The procedure for this will be described in another part of this specification.

When the operator changes the value of a property E of a certain component type the management program carries out this change for all the components of that type.

If the operator wishes to transfer a specific component from one document to another, the management system checks whether there is already a component type with the same name present in the destination document. If not, the management system defines in the destination document a component type by name and properties of the component to be transferred and places this component in the document. If, however, a component type with the name of the component to be transferred is already present, the management system proposes the operator to adapt the component to be transferred to the values of the properties of the component type already present.

A readily overviewable way of inputting or changing properties is obtained by inputting three levels at which access is obtained to certain properties operative on that level. At the highest level ("the page level") a page properties window 26 displayable on the screen 2 enables properties to be described in detail or changed at these then can apply to the whole page. On this level, for example, it is possible to specify the location of margin lines, headers, footers, and text orientation with respect to the page area.

At the middle level (the component level) a component properties window 27 which can also be displayed enables properties applicable specifically for each component to be described in detail or changed. At this level it is possible, for example, to make all the specifications concerning the font to be used and the offset and tabulator values.

At the lowest level (text level) it is possible to make changes to the lines of the text, e.g., a different font type and different offset and tabulator values. They are specified by means of the text properties window 28.

All data specified by means of the said properties windows 26, 27 and 28 are managed by the said management program.

Presentation of a Document

Figure 3:
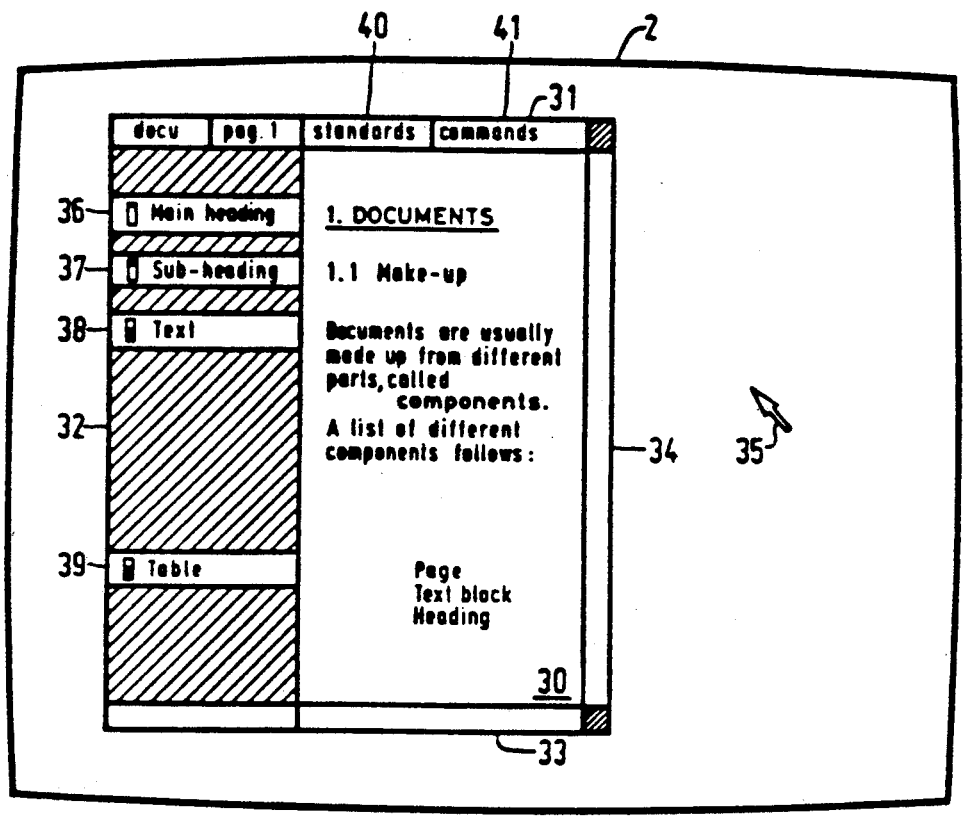
FIG. 3 to FIG. 6 show the screen of a system according to the invention during use.

FIG. 3 shows the screen 2 of a system according to the invention, displaying thereon the document shown in FIG. 2. The text of the document or a part thereof is displayed in a text window 30 surrounded by a frame made up of a top frame 31, a left-hand frame 32, a bottom frame 33 and a right-hand frame 34. The cursor 35 is also present on the screen 2. The top frame 31 is divided into a number of compartments containing the identification of the document, the page number and one or more sub-fields (e.g., the standard field 40 and the command field 41).

The left-hand frame 32 contains a number of labels 36 to 39 which are disposed at the start of each component and which contain the type name of that component and/or an associated identification symbol.

This Figure shows a component of the "table" type (23) and one of the "text" type (22) from FIG. 2. Both are of the "text block" kind and have properties set to different values in respect of location relative to the margin and width, this being set by means of the component properties window.

This Figure also shows the bottom frame 33 and the right-hand frame 34. These contain scroll bars by means of which another part of the document can be placed in the text window 30 by means of the cursor 35. It is assumed that the use of scroll bars is known.

Presentation of the Properties of the Document Page

Figure 4:
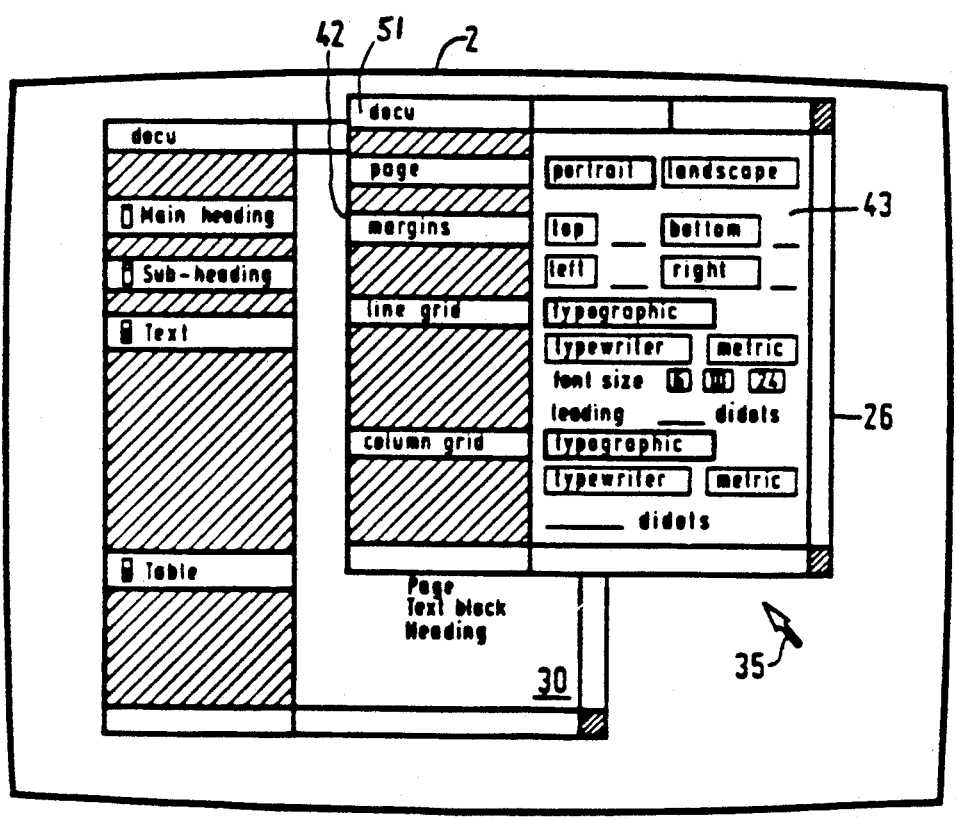

FIG. 4 shows the screen 2 of a system according to the invention, displaying thereon the standard properties of the page component. In the event of a change of these properties the change is in principle carried out for all the components in the entire document.

The calling up of these standard properties by the operator will be discussed at a later stage.

The said standard properties are displayed by the system in the page properties window 26 which partially overlaps the text window 30 of the document to which it relates. At the top the page properties window 26 has a name bar 51 stating the name of the document, e.g., "docu". The window 26 is also divided up into a left-hand part 42 giving the identifications of the various properties in labels, and a right-hand part 43 giving the set values of those properties. Thus, for example, the property "page" is the one indicating the orientation of the text with respect to the page area. In the case of the "portrait" option the text is reproduced over the short side of the page while in the case of the "landscape" option it is reproduced over the long side of the page. The property "margins" can be used to select the various kinds of margins along the page edges and set them to a specific value.

Presentation of the Properties of a Component

Figure 5:
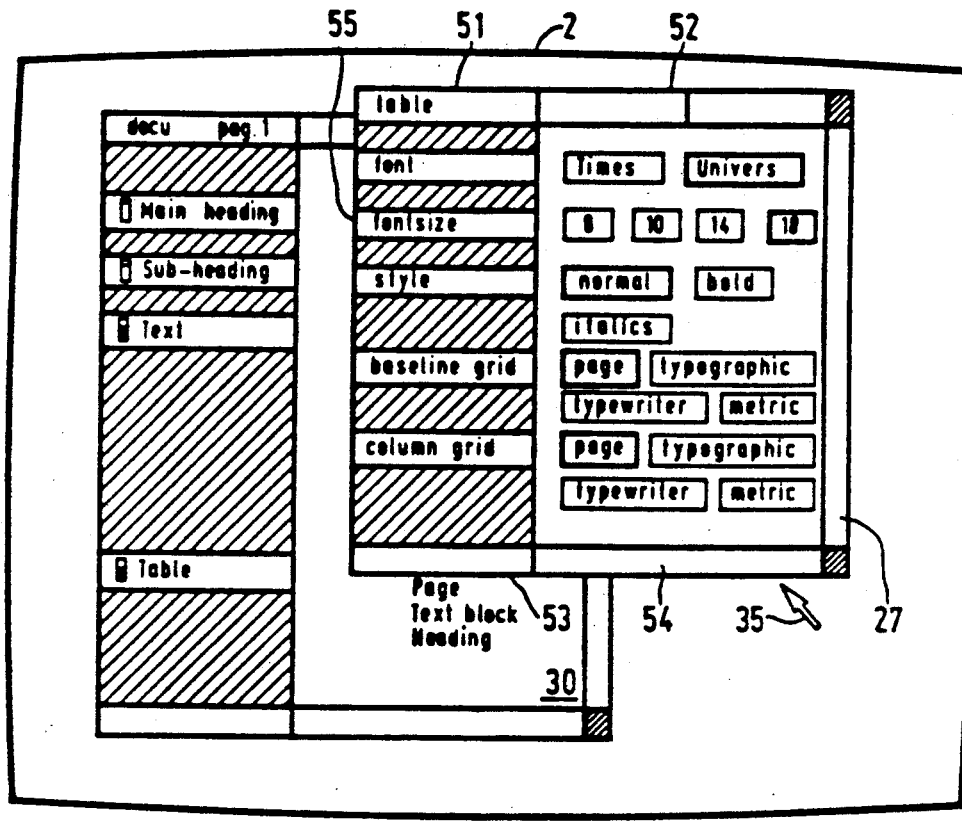

FIG. 5 shows the screen 2 of a system according to the invention displaying thereon the properties of a component, in this case those of the component "table" in the document of FIG. 2. The calling up of the properties of a component by the operator will be discussed hereinafter.

The properties are displayed by the system in a component properties window 27. It partially overlaps the text window 30 of the document to which it relates. The component properties window 27 has at the top a name bar 51, stating the type name of the component, "table" in this example.

The properties window 27 is divided up into a left-hand part 53 giving the identifications of the various properties in labels, and a right-hand part 54 giving the set values of those properties. In some cases only the head name of a property is mentioned in the left-hand part 53, although it relates to a number of different elements. For example, the property "separation" comprises two elements "leading space" and "trailing space". The latter one indicates the space to be left blank beneath this component. By setting the latter property to O the component may be followed by the next component without any intermediate space. For reason of space saving these elements are positioned in the right-hand part 54, which has not any consequence for the setting of the respective values. The property "horizontal offset" indicates the distance between the margins of the component and the page margins (defined in the page properties), on both the left and right. This property is set to 20 mm left and 20 mm right, which means that the component lines must start 20 mm to the right of the left-hand margin of the document and stop 20 mm to the left of the right-hand margin of the document.

The property "font size" indicates the format of the character font to be used. This has a default value of 10 which can be changed if necessary.

In the case of properties for which there is only a small number of options, the value set is indicated in some other way: all the possible settings are shown in the right-hand part of the properties window 27 and the set value is indicated by a blackened frame. It should be noted that the form, selected properties, and their possible setting as shown in FIG. 5 are intended solely as an example.

The presentation in FIG. 5 corresponds to the system setting as shown in FIG. 3, in which there is a "table" component type.

Presentation of the Properties of a Sub-Component

Figure 6:
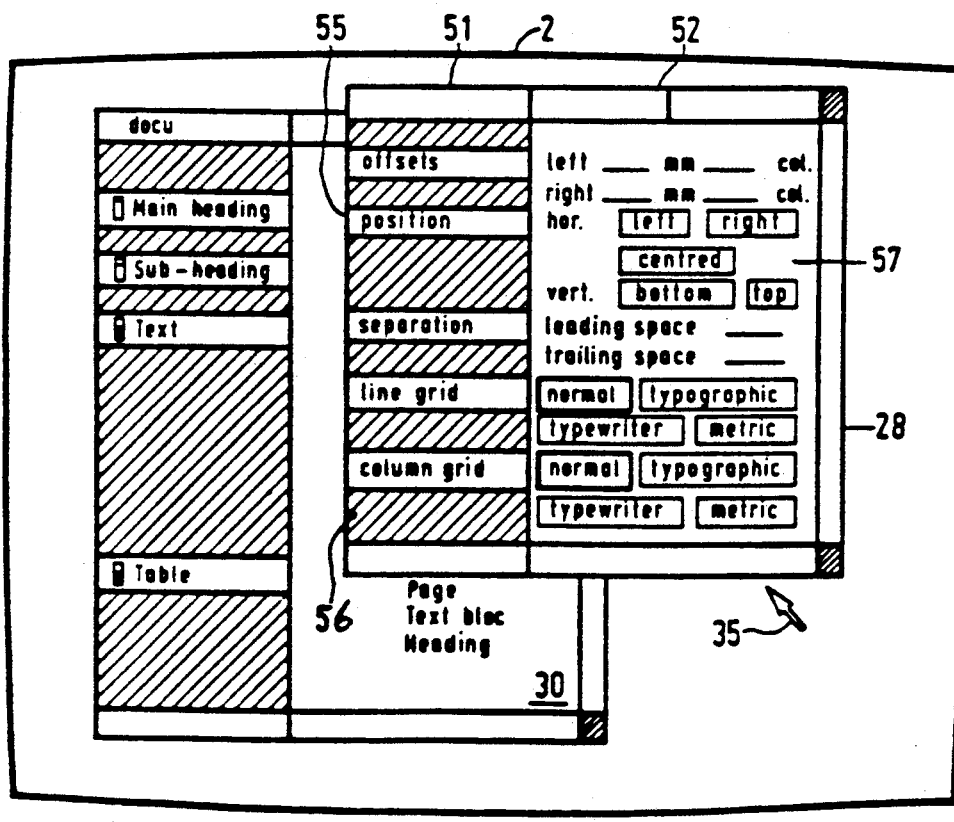

A properties window, the so-called text properties window 28 (see FIG. 6) can be displayed even for sub-components, such as the individual alphanumerical characters in a component. The properties shown in this form a sub-set of those of the component.

The text properties window 28 partially overlaps the text window 30 of the document to which it relates. The text properties window 28 is also divided up into a left-hand part 56 giving the identifications of the various text properties in labels, and a right-hand part 57 in which the set values of said properties are shown. For example, the property "offsets" is the one which defines the movement of the text with respect to the margin chosen for the page (see "margins" in the page properties window 26), while the property "separation" relates to the space to be taken into account at the beginning and end respectively of the text part now to be input.

Operating Procedures

The operation of the system will now be described with reference to operating procedures for system actions associated with the invention.

The actions of the operator are always shown on the left and the system actions initiated as a result are shown on the right in FIGS. 7a, 8a, 9a, 10a and 11a.

Calling Up Properties of a Specific Component Type

Figure 7A:
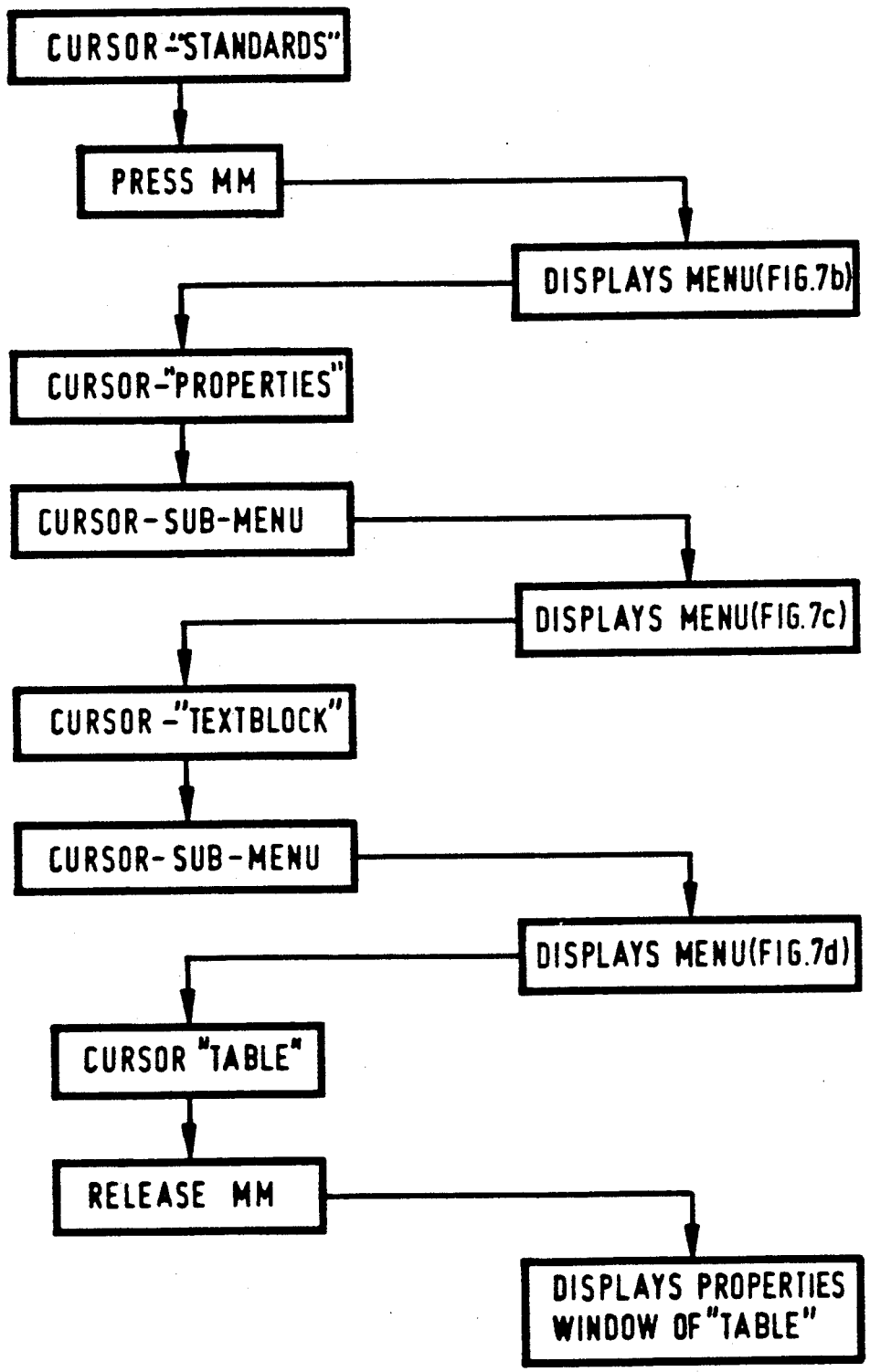
FIG. 7a is a diagram of a procedure for calling up properties of a component type.

The procedure for displaying on the screen the properties of a specific component type and their set value is shown in FIG. 7a. The example selected is the display of the properties of the component type "table" in the document of FIG. 2.

Figure 7B:
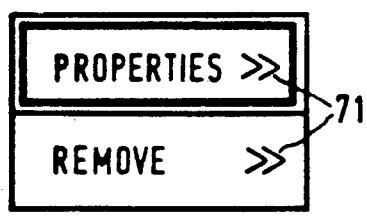
Figure 7C:
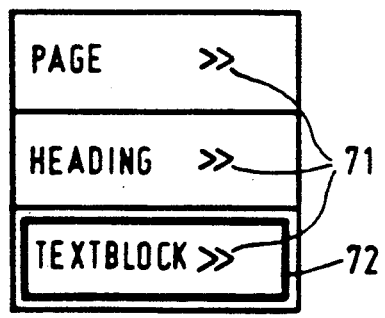
Figure 7D:
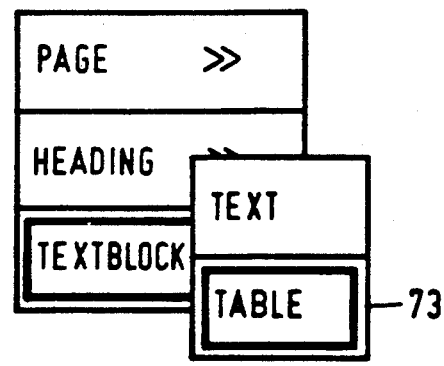

The procedure starts with the operator placing the cursor in the "standards" field of the top frame 31 of the text window 30 (see FIG. 3). The operator then presses on the mouse menu button MM, whereupon the system displays a menu window (see FIG. 7b) with the items "properties" and "remove". An arrow symbol 71 is provided at both items in this menu and indicates that a sub-menu can be displayed here. The operator then moves the cursor, which has assumed the form of a frame 72 or a change of color of the menu field in the menu, to the item "properties" and moves the mouse outwards in the direction of the symbol 71, whereupon the system displays the sub-menu 72 (see FIG. 7c). The operator then moves the cursor to the "text block" menu field and moves the mouse in the direction of the symbol 71, whereupon the system displays the sub-menu 73 (FIG. 7d). In this sub-menu the operator moves the cursor to the field "table". On release of the menu button on the mouse the system now calls up the properties of the "table" component type and displays them on the screen in a component properties window.

Calling Up Properties of a Page Component

The procedure for displaying the properties of a page component and the set value on the screen is similar to that for a specific component type as explained hereinbefore. Instead of moving the cursor to the "text block" menu field, the cursor is now set to the item "page". This finally results in the display of a page properties window 26 on the screen 2.

Change of the Value of Properties

The procedure for changing the value of properties is shown in FIG. 8a. The example selected is the change of the style of the component "main heading" (20) in the document of FIG. 2 from bold face to italics. In accordance with the procedure indicated hereinbefore, the operator calls up the properties of the component "main heading", brings the cursor in the right-hand part of the component properties window level with the label "style" and selects the "italics" field with the mouse selection button MS. The system responds to this by enclosing this field in a black frame and at the same time removing the black frame surrounding the old setting ("bold"). The operator then presses the mouse menu button MM, whereupon the system displays at the cursor the menu as shown in FIG. 8b. This menu contains the fields "apply" and "reset". By indicating the "apply" field with the cursor the operator now gives the system the order to change the style. On release of the menu button MM the system changes the value of the property "style" to "italics" and then applies this change to all the components of the "main heading" type.

Change of Properties of Sub-Components

Figure 9A:
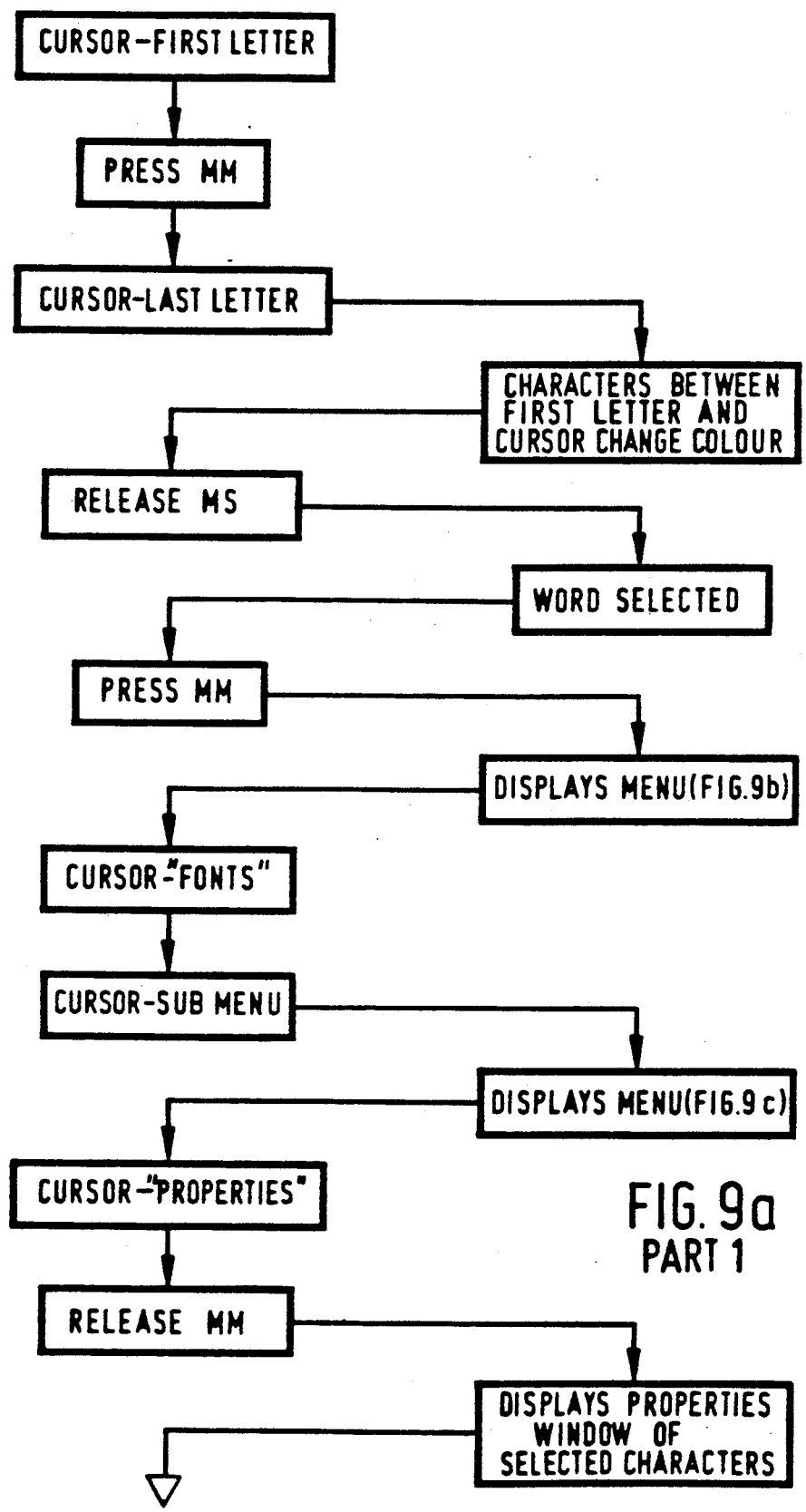
FIG. 9a, Parts 1 and 2, is a diagram of a procedure for changing the value of properties of sub-components.
Figure 9B:
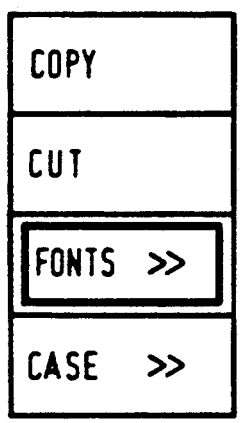
Figure 9C:
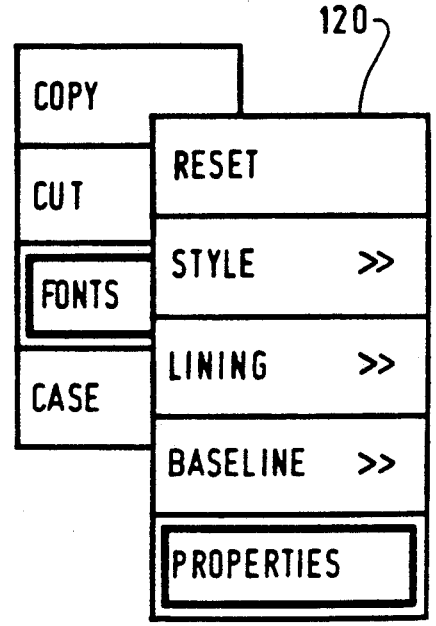
Figure 10A:
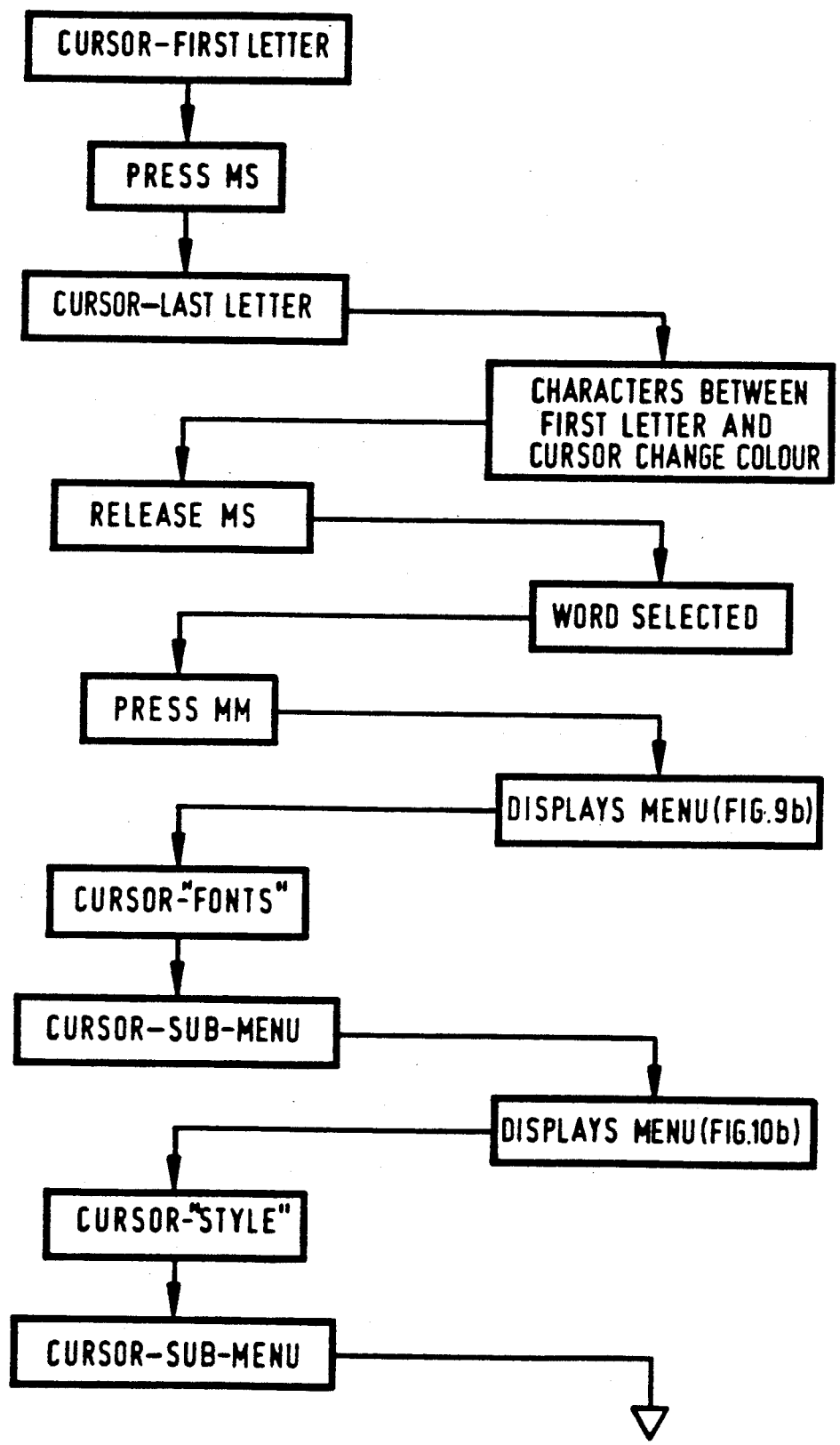

FIG. 9a shows the procedure for changing the value of properties of sub-components, such as alphanumerical characters within a component. In the document shown in FIG. 2 the word "components" in the text block 22 is reproduced in bold face. The following example will shown how this is effected. The text used as a basis is one in which the associated word is still reproduced in normal type. The operator brings the cursor in the text to the first letter of the word and presses the mouse selection button MS. He then moves the cursor to the last letter of the word, the system changing the color of all the intermediate letters or reproducing them in reverse video. On arrival at the last letter the operator releases the selection button MS whereupon the system selects the word "components". When the operator presses the mouse menu button MM the system displays at the cursor on the screen the menu, shown in FIG. 9b. This contains a number of system commands (copy, cut) and selection fields for fonts and the capitals and lower case selection ("case"). In the menu the user uses the cursor to select the field "fonts" and then the associated sub-menu. This is shown in FIG. 9c with the reference 120. The sub-menu contains a "properties" field by means of which it is possible to call up the text properties window of the selected characters, which now contains only typeface properties, and fields for directly changing the value of properties (this procedure will be discussed hereinafter).

The operator calls up the text properties window 28 of the selected characters by indicating the field "properties" with the cursor and releasing the menu button MM. The system then displays the properties window with the properties of the selected characters on the screen. Of course this is only possible if all the selected characters have the same properties. If this is not the case, the system answers by an error display on the screen.

In the text properties window, the field "normal" at the property "style" has a black frame to indicate that these characters are reproduced in normal typeface. In order that the typeface of the word "components" may be printed in bold type, the operator selects in the text properties window at the property "style" the value "bold".

The system then moves the black frame of the field "normal" in the text properties window to the "bold" field.

The operator then presses the mouse menu button MM, whereupon the system displays the menu as shown in FIG. 8b, moves the cursor in that menu to the "apply" field, and releases the menu button MM. The system then includes the amended value of the "style" in the sub-local amendments list of the selected characters, changes the "style" of those characters in the text window and removes the properties window from the screen, thus completing the change of "style".

Since changes of style properties occur regularly and the above method requires a fairly large number of operations, the system also has a faster method for this. This method will be described with reference to FIG. 10a. After selecting the required characters (this is done in the same way as in the first method), the operator again presses the mouse menu button MM, selects the "fonts" menu field (FIG. 9b) and then the "style" field in the sub-menu (120, FIG. 10b). The associated sub-menu (121, FIG. 10c) contains the fields "normal", "bold" and "italics".

The operator uses the cursor to select the "bold" field and releases the menu button MM. The system then includes the change in the amendments list of the selected characters, changes the style of those characters in the text window and removes the menus from the screen.

Removal of a Properties Window From the Screen

Figure 11A:
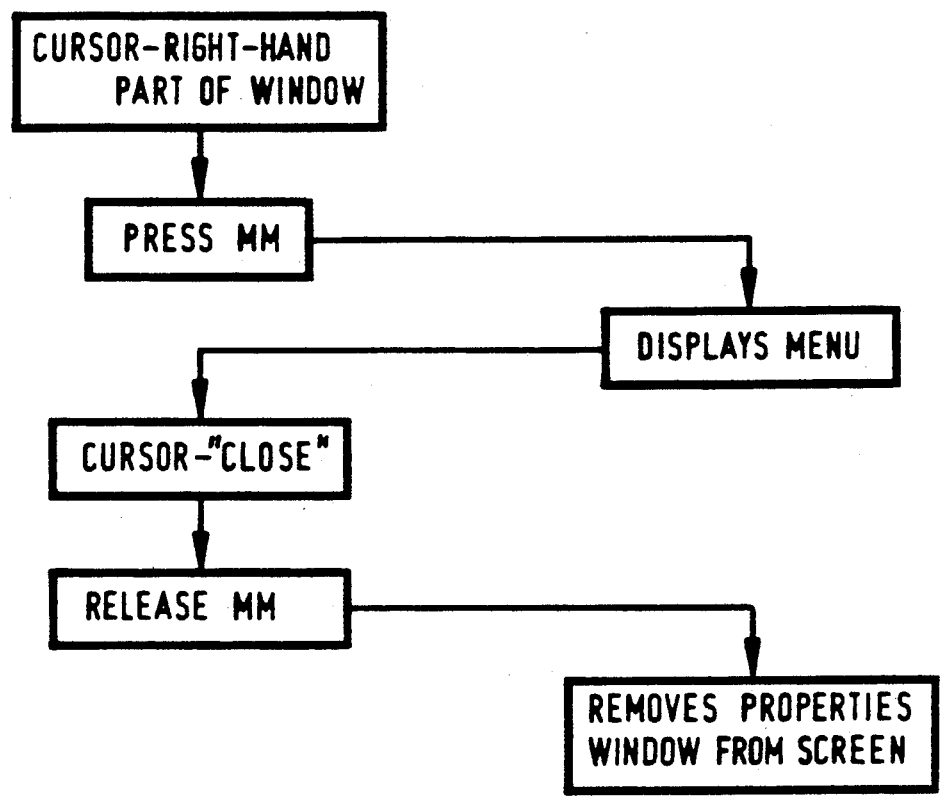
FIG. 11a is a diagram of a procedure for removing a properties window from the screen.
Figure 11B:
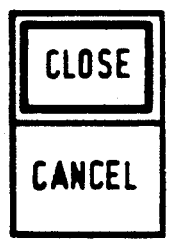

In order to take the processing of a document further, the properties window must first be removed from the screen. This can be done as shown in FIG. 11a by placing the cursor in a blank part of the right-hand part of the properties window and pressing the mouse menu button MN. The system then displays a menu as shown in FIG. 11b. This contains the fields "close" for the immediate removal of the properties window and "cancel" for cancelling the changes shown in the window and then removal of the properties window. By moving the cursor to the "close" field and releasing the menu button MM the operator can make the properties window disappear from the screen and then continue with processing his document.

Although the invention has been explained by reference to the foregoing description and associated drawings, it is not restricted thereto. Numerous alternative embodiments will be obvious to the skilled addressee within the scope of the claims.

System commands could, for example, also be keyed in directly, without the use of a mouse or menus. The commands in the menu in this description have been given solely by way of example and, similarly, the component kinds and component properties described are only a selection of a wider collection.

The way in which the invention is embodied in the system software can also be carried out in various ways. Finally, the invention can also be applied to systems based on a hierarchical document model of components at different levels each provided with properties having global and local values.

Document Lay-Out

In order to obtain a regular layout of a document, the system uses a grid pattern built up of a set of equidistant horizontal lines (base line grid) and a set of equidistant vertical lines (column line grid). The base line grid is used to enable the text to be positioned on those lines.

Each character that is input (except for subscript elements and superscript elements) is always placed on a line of the base line grid of the associated page. If the distance between two consecutive base lines is too small for text to be positioned therebetween without touching the text on the preceding base line, one or more base lines will be skipped until a base line is found at which the text line to be placed on that base line no longer touches the previous line of text. If a font of a different format is used for a subsequent line of text, the system will re-determine what base line must be selected to prevent the text line to be positioned from touching the previous line of text.

The selection of a subsequent base line to enable the new text line to be positioned thereon takes into account the maximum distance (the descender $d_{max}$) beyond which a character can project beneath the previous base line. The maximum height (ascender $a_{max}$) beyond which a character can project above the base line to be used is then determined for the text line to be positioned. The ascender value and descender value are fixed data for each font. A leading spaces is also required between the consecutive text lines. This is the empty space between the top of the characters in a line and the bottom of the characters from the preceding line. Given a base line spacing of 1, the system determines, in the inequality relation $a_{max}+d_{max}+s \leq n.1$, the minimum possible value of n, n denoting the serial number of the base line following that base line on which the last text line has been placed. Complications occur if a plurality of character fonts are used in one text line to be placed on one and the same base line, e.g., in order to accentuate a specific part of the line of text. If the ascender value has to be determined for that text line, then the maximum value of the ascender values of the respective fonts is determined and used as a replacement value $a_{max}$. The same applies in respect of the descender value $d_{max}$.

For determining the next text line as mentioned above the system is provided with control means responding on the display means, and with:

first means for registering the grid line spacing (d) associated with the set of grid lines relating to the model form in an orientation direction representing the reading direction, second means for determining and registering a standard ascender height for the sake of a text line to be reproduced, making use of each ascender height being relevant to said text line, third means for determining and registering a standard descender height for the sake of the text line preceding the said text line, making use of each descender height being relevant to said preceding text line, fourth means for storing a leading space to be applied between two consecutive text lines, and arithmetic means for determining a text line distance to be expressed in grid line distances, for positioning the text line to be reproduced, for the sake of the control means on the basis of the data item registered in the first means and of the sum value of the data registered in the second, third and fourth means.

If more character fonts are used in the same text line (see FIG. 12, third text line), the second means will be supplied by the specific ascender height value pertaining to the font for each character to be used in that text line. From these individual ascender height values these means determine the maximum value for this line. The same occurs in the third means as to the descender height.

The above means for the determination of a new text line form part of the arithmetic section and memory of the system.

The (replacement) ascender value and the descender value are redetermined in the event of a change of a text line and then the associated base lines are determined for that text line and the following text lines.

The grid pattern is adjustable for each page. To this end, the properties window 26 shown in FIG. 4 is called up on the screen 2, and contains two properties in respect of the grid pattern, i.e.. the properties: base line grid and column grid. There are three options for each of the two properties and these are indicated in the drawing by "typographic", "typewriter" and "metric".

In the case of the "typographic" option, a defined line space is required for each font size in the case of a base line grid. The distance between two consecutive grid lines is expressed in Didot points. The required font size must therefore also be indicated in Didot points and information concerning the leading space (s) must also be input in Didot points. In the case of the "typographic" option the page properties window 26 is additionally provided, in respect of the base line grid, with a first properties line having various compartments for the font size with numerical values (6; 7; 8; . . . ; 32) and also a second properties line for the leading space with the framed data "compact", "normal" and "wide" and, in respect of the column grid, with a compartment where a value between 0 and 9 Didot points can be input optionally. The required choices can thus be specified.

The font size and leading space selected determine the base line spacing of the grid. The distance between successive columns also follows from the value input in the column grid.

If the "typewriter" option is selected, and adapted page properties window appears on the screen 2 and differs from the properties window shown in FIG. 5 in that a line with indications of the line spacing values to be used occurs between the properties line of the base line grid and the properties line of the column grid. These values correspond to those of an ordinary typewriter, i.e., 1, 1½ and 2, which are respectively equivalent to 6, 4 and 2 grid lines per inch. With regard to the column grid, it is possible to select a fixed character spacing as is conventional on an ordinary typewriter. In that case the character spacing of the font must be chosen in pitch, which defines the number of column lines per inch. In the case of the "metric" option an adapted properties window appears on the screen in which the operator himself can type into a compartment a metric value for the distance between two successive grid lines.

The distance between two consecutive columns is adjustable similarly.

It is not intended for the grid pattern to be displayed on a reproduction medium such as a screen during the preparation of documents or a sheet during the printing out of a document. As will be explained with reference to FIG. 12, however, it is possible to display the grid pattern for demonstration purposes. To this end, the "commands" field in the top frame 31 of the document window in FIG. 3 should be selected by means of the mouse menu button (MM) and then, the pressure being maintained on the button, the cursor should be moved to the "show" option in the menu field then called up and then the "grid" option should be selected in the sub-menu then displayed.

The possibilities for specifying a page grid are thus shown.

The properties associated with the page grid must then be specified in detail for each component in the component properties window 27. The properties are indicated by "font class", "style" and "lining".

With regard to the property "font class" there are a number of options, i.e., "typographic" and "typewriter" each having its own series of font types: "Times" and "Univers"; and "Courier", "Letter Gothic" and "Prestige" respectively, and also "size in Didot" with associated property values.

The property "style" has the options "normal", "italics" and "bold", while the property "lining" gives the possibility of underlining the text if required.

The use of "subscripts" and "superscripts" should also be specified in the component properties window.

With these data input by means of the component properties window 27 the ascender and descender values a and d respectively of the font are fixed since they are of course based on values specified by the font designer. From the inequality relation $a+d+s \leq n.1$, where a is the ascender of the text line still to be positioned, d is the descender of the previous line and l is the line spacing between two consecutive base lines, the system then determines the minimum value n which satisfies this. This value n then gives the serial number of a base line following the last text line and on which the new text line is to be positioned. If a local change in respect of the data concerning the property "font class" specified in the component properties window is to be carried out in a text component, it should be carried out by means of the text properties window 28. The changes to be made in such cases may cause the text portion to get a different ascender and descender value. The system keeps count the maximum value of the ascenders and descenders applicable to the intended text line. The serial number n is then determined again by reference to the inequility relation described, a and d now being replaced by the maximum value of the ascender values applicable in the intended text line and the maximum value of the descender values used in the previous text line, respectively.

The result of a different font size in a text will be seen in FIG. 12, where the number "24" is shown a larger font in the middle of the page. The result of the larger ascender and descender values of that intended font is that the base line of that line has skipped a grid line. This is also the case with the base line of the next line of text (even though the digits 2 and 4 do not themselves have descenders the font itself does).

It is possible to give a specific-text component a different grid pattern from that defined at page level by means of the page properties window. A change of this kind should be made by means of the component properties window 27. For this purpose the latter window has two properties "base line grid" and "column grid", each of which has the selectable items "page", "typographic", typewriter" and "metric".

The item "page" is a preselected or default value and indicates that the input values at the page properties window are applicable (and therefore do not lead to a different grid). However, a change of the grid at component level is obtained by selecting for each property designation one of the indicated three items "typographic", "typewriter" and "metric", whereupon a selection should again be made from the options following these. A selection procedure of this kind has already been explained in connection with the page properties window.

What is claimed is:

1. Desktop publishing system to prepare and manage documents to a model distinguished by graphic properties, comprising:
   a. inputting means for inputting commands and document information relating to graphic elements; and
   b. a processing unit operable, by reference to said document information and commands, to use a model having a number of sets of grid lines, equidistant oriented per set to define a grid line spacing, for positioning the input document information, at least some of these sets being allocated different orientation directions, and comprising means for registering input data to adjust said grid line spacing and orientation direction applicable per set, and means for positioning graphic elements, said positioning means using a last grid line used as a reference line, said positioning means further taking into account format data of graphic elements positioned with respect to said reference line, format data of graphic elements still to be positioned with respect to a following grid line, and a certain spacing between graphic elements positioned with respect to said reference line and graphic elements still to be positioned with respect to said following grid line, for selection from the grid lines following the first mentioned reference line the next grid line which is to be considered as a subsequent reference line for the graphic elements still requiring to be positioned.

2. Desktop publishing system according to claim 1, wherein said model is specified by two orthogonal oriented sets of parallel grid lines.

3. Desktop publishing system according to claim 1, including character-displaying means and control means responding thereon for positioning text lines on a reproduction medium, having
   i. first means for registering the grid line spacing (d) associated with the set of grid lines relating to the model in an orientation direction representing the reading direction,
   ii. second means for determining and registering a standard ascender height with respect to a text line to be reproduced, making use of an ascender height corresponding to each graphical element to be positioned on said text line,
   iii. third means for determining and registering a standard descender height with respect to the text line preceding the said text line, making use of a descender height corresponding to each graphical element positioned on said preceding text line,
   iv. fourth means for storing a leading space to be applied between two consecutive text lines, and
   v. arithmetic means for determining a text line distance to be expressed in grid line distances, for positioning the text line to be reproduced, for the control means on the basis of the grid line spacing (d) registered in said first means and of the sum value of the data registered in said second, third and fourth means.

* * * * *